Sept. 23, 1952 J. H. WEBB 2,611,575
QUICK-ACTING GATE VALVE
Filed Nov. 14, 1947
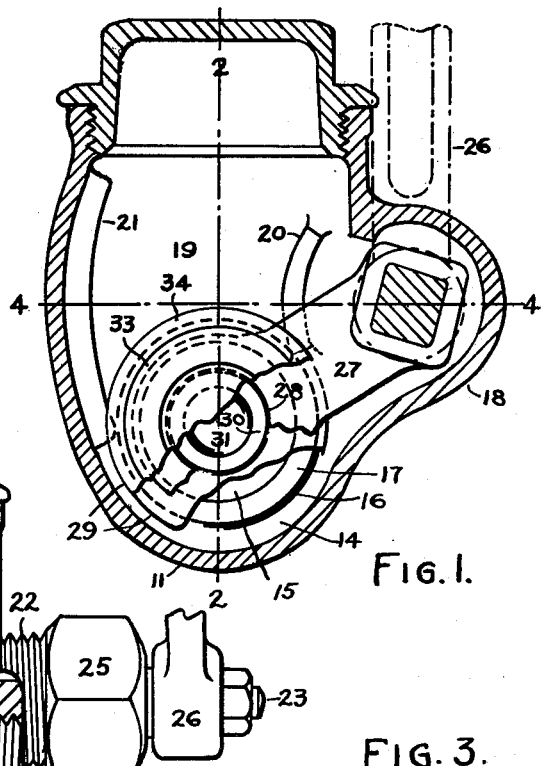
Inventor
J. H. Webb

UNITED STATES PATENT OFFICE 2,611,575

QUICK-ACTING GATE VALVE

James H. Webb, Montreal West, Quebec, Canada, assignor, by mesne assignments, to Jenkins Bros., Bridgeport, Conn., a corporation of New Jersey Application November 14, 1947, Serial No. 786,030
In Canada February 28, 1938

Section 1, Public Law 690, August 8, 1946
Patent expires February 28, 1958

8 Claims. (Cl. 251—18)

This invention relates to improvements in quick acting gate valves and the object of the invention is to provide in a valve of such type means to hold the gate out of contact with the body seats except when the valve is fully or substantially fully closed thereby to protect the seat surfaces of the body and gate against being scored or cut during the opening and closing of the valve.

Quick acting gate valves as generally constructed embody a loosely mounted gate, usually comprising a pair of leaves connected by a universal joint, mounted on an actuating arm and adapted to be thereby wedged between converging seats of the valve body. Owing to the manner of mounting the gate, and to the gate construction if it is of the aforesaid leaf type, the gate has certain freedom of movement when not fully closed which permits it to be disposed with its seat surfaces out of parallelism with the body seat surfaces. If, during the opening or closing of the valve, the gate is thrust by fluid flowing through the valve against a body seat while out of parallelism therewith, the edges of the gate seat tend to score or cut the surface of the body seat and the edges of the body seat tend to score or cut the surface of the gate seat so that the valve soon begins to leak. This necessitates re-grinding of the gate and body seat surfaces, which operation cannot be easily performed without removing the valve from its service position. Re-grinding of the seat surfaces permits deeper penetration of the gate between the body seats and after a very limited amount of regrinding the penetration is such that the gate contacts the bottom of the body and prevents proper wedging of the gate between between the seats so that the valve will not close tightly and therefore becomes unserviceable.

According to this invention, the valve body is provided with guide ribs formed and disposed to be engaged by the gate at the commencement of the opening movement and to cam the gate away from the body seat surfaces and hold it out of contact with the body seat surfaces until the valve is again closed. The gate is formed with marginal rib engaging portions offset below the seat surfaces of the gate so that these surfaces cannot come into contact with and be scored by the guide ribs. By holding the gate as aforesaid, the edge engagement of the gate seats and body seats with one another is prevented and scoring of the seat surfaces of both the gate and the body seats is avoided.

In the accompanying drawings which illustrate one embodiment of the invention but to the details of which the invention is not limited as modifications and substitutions of equivalents may be made—

Fig. 1 is a vertical sectional view of a quick acting gate valve, in the plane of the gate, showing the gate closed.

Figs. 2 and 3 are vertical sectional views on the line 2—2 of Fig. 1, looking to the right and left, respectively.

Fig. 4 is a horizontal sectional view on the line 4—4 of Fig. 1 showing the gate open.

While the invention is hereinafter described and illustrated as embodied in a valve having the gate composed of leaves pivotally related to one another and to the actuating arm, it will be understood it is not limited to such construction but applies equally to valves having one-piece gates.

Referring more particularly to the drawings; 11 designates a valve body having annular necks 12 at opposite ends thereof constituting axially aligned flow passages, either of which may be an inlet, while the other is an outlet. The necks 12 are suitably formed for connecting the valve to a pipe line, for example, by the provision of internal screw threads as shown. A pair of transversely disposed walls 14 are provided within the body between the flow passages 13 and are spaced apart in the axial direction of the body. These walls extend from side to side of the body and isolate the two flow passages 13 from one another. The walls are, in turn, provided with flow passages 15 approximately in axial alignment with the flow passages 13 and surrounded by annular seat portions 16 projecting inwardly from the adjacent faces of the walls. The adjacent surfaces 17 of these annular seats 16 are machined smooth and constitute seat surfaces for a closure member or gate.

The body is provided at one side with a lateral extension 18, the axis of which is to one side of and above and parallel with the axis of the flow openings 13 and 15. The seat surfaces 17 converge downwardly and to a lesser extent laterally toward the extension 18, the axis of lateral convergence being a line normal to and connecting the axis of the body extension 18 and the axis of the flow openings 13 and 15. The end walls 19 of the body are provided with arcuate ribs 20 and 21 extending upwardly from points adjacent the seats 16, the ribs 20 being located adjacent the extension 18 and the ribs 21 being located at the opposite side of the seats 16 from the extension 18. These ribs are circularly curved from centres located in the axis of the extension 18. In addition the adjacent faces of the ribs 20 and the adjacent faces of the ribs 21 converge upwardly from their lower ends at least part way to their upper ends, the convergence having predetermined relation to the downward convergence of the seat surfaces 17, as will be hereafter more fully explained. The actual convergence of the ribs 20 may be greater than the actual convergence of the ribs 21.

The body extension 18 is provided at one end with a hollow neck 22 which may be cast integral therewith, or which may be separately formed, as shown in the drawings. This neck forms a bearing for a rotatable spindle 23, the inner end of which is journalled in the body as at 24. The outer end of the neck is provided with any suitable or usual stuffing box, indicated as a whole by the numeral 25. An operating handle 26 is rigidly connected to the outer end of the spindle. A gate actuating arm 27 is rigidly connected to the inner end of the spindle and in the closed position of the gate extends laterally and downwardly between the body seats 16. The free end of the actuating arm 27 is provided with an opening 28 for the attachment of the valve gate.

The gate comprises a pair of cooperating discs or leaves 29, one of which has a central circular boss 30 engaging in the opening 28 of the actuating arm and formed with a hemispherical recess 31 for reception of a hemispherical boss 32 centrally disposed on the other disc or gate leaf. The outer or remote faces of the leaves 29 are formed with raised annular seat portions 33, which are machined smooth and are adapted to cooperate with the seat surfaces 17 of the body. Each of the leaves or discs 29 has a marginal portion 34 located radially outwardly of the seat 33 and adapted to engage the body ribs 20 and 21.

When the valve is closed, as shown in Figs. 1 and 2, the gate is wedged between the converging body seats 16, the seat surfaces 33 of the gate valves being in engagement with the seat surfaces 17 of the body. When the valve is opened the actuating arm 27 swings the gate into the upper part of the body and out of register with the flow passages 15. At the commencement of the opening movement diametrically opposite marginal portions 34 of the gate leaves engage the lower ends of the ribs 20 and 21. As the gate rises from between the inclined seats 16, the leaves 29 are free to oscillate, but this freedom is restrained by the upward movement of the gate between the upwardly converging ribs 20 and 21 which press the leaves toward one another and hold them against being moved into contact with the seats 16, either by force of gravity or by pressure of fluid flowing through the valve. When the valve is fully open the gate leaves are held quite tightly in the upper part of the body out of register with the flow passages 15 and with sufficient rigidity to prevent them being caused to chatter or vibrate by reason of the fluid flow through the valve. The upward convergence of the ribs 20 and 21 is in such relation to the upward divergence of the seats 16 that the gate leaves are held against spreading during opening or closing of the valve in suchwise as would permit the edges of the seat surfaces 33 to drag across the body seat surfaces 17, or in suchwise as would permit of the seat surfaces 33 being dragged over the edges of the seat surfaces 17 with seat scoring effect. It will be noted that the engagement between the gate leaves and the guide ribs 20 and 21 is confined to the marginal portions of the leaves outside the seat surfaces 33 so that these seat surfaces never come into contact with and cannot be scored by the guide ribs. The natural tendency of the gate leaves is to separate at the top when the valve is partly or fully open and to separate to any limit permitted by the body. The guide ribs 20 and 21 also serve to hold the seating surfaces 33 of the gate leaves out of contact with the rough interior surfaces of the body end walls and prevent scoring of the gate seat surfaces by such contact.

Having thus described my invention, what I claim is:

1. A quick acting gate valve comprising a body having axially aligned inlet and outlet passages and a pair of spaced transverse walls between the inlet and outlet formed with flow passages and annular seat portions surrounding said flow passages; a gate having seat engaging surfaces adapted to co-operate with said seat portions, a spindle at one side of the gate; operative connection between said spindle and the gate adapted to move the gate in an arcuate path into and out of register with the body seats; and guide ribs in the body curved in conformity with the path of gate movement and adapted to be engaged by marginal portions of the gate disposed outwardly of the seat engaging surfaces during substantially the entire opening and closing movements of the gate to hold the gate seat surfaces out of contact with any of the interior surface of the body, except when the valve is substantially fully closed.

2. A quick acting gate valve comprising a body having axially aligned inlet and outlet passages and a pair of spaced transverse walls between the inlet and outlet formed with flow passages and annular seat portions surrounding said flow passages; a gate having seat engaging surfaces adapted to co-operate with said seat portion, a spindle at one side of the gate; operative connection between said spindle and the gate adapted to move the gate into and out of register with the body seats; and guide ribs in the body adapted to be engaged by marginal portions of the gate disposed out of the planes of the seat engaging surfaces to hold the gate seat surfaces out of contact with any of the interior surface of the body, except when the valve is substantially fully closed, said guide ribs being disposed at opposite sides of the gate and converging upwardly from their lower ends toward their upper ends through a major portion of their lengths.

3. A quick acting gate valve comprising a body having axially aligned inlet and outlet passages and a pair of spaced transverse walls between the inlet and outlet formed with flow passages and annular seat portions surrounding said flow passages; a gate having seat engaging surfaces adapted to cooperate with said seat portions, a spindle at one side of the gate; operative connection between said spindle and the gate adapted to move the gate into and out of register with the body seats; and guide ribs in the body on opposite sides of the axis of said inlet and outlet passages adapted to be engaged by marginal portions of the gate to hold the gate seat surfaces out of contact with any of the interior surface of the body, except when the valve is substantially fully closed, said ribs being circularly curved from centres located in the axis of said spindle whereby said ribs are disposed parallel with the path of travel of the gate, said ribs at each side of the axis of the inlet and outlet passages converging upwardly from their lower ends at least part way to their upper ends, thereby to position the gate as it opens and to hold it rigidly when fully open.

4. A quick acting gate valve comprising a body having axially aligned inlet and outlet passages and a pair of spaced transverse walls between the inlet and outlet formed with flow passages and annular seat portions surrounding said flow passages; a gate adapted to cooperate with said seat portions, said gate having raised annular seat surfaces and marginal portions disposed out of the planes of the seat surfaces; a spindle at one side of the gate; operative connection between said spindle and the gate adapted to move the gate into and out of register with the body seats; and guide ribs in the body on opposite sides of the axis of said inlet and outlet passages adapted to be engaged by said marginal portions of the gate to hold the gate seat surfaces out of contact with any of the interior surface of the body, except when the valve is substantially fully closed, said ribs being circularly curved from centres located in the axis of said spindle whereby said ribs are disposed parallel with the path of travel of the gate, said ribs at each side of the axis of the inlet and outlet passages converging upwardly from their lower ends at least part way to their upper ends, thereby to position the gate as it opens and to hold it rigidly when fully open.

5. A quick acting gate valve comprising a body portion having axially aligned inlet and outlet passages; a pair of transverse walls within the gate body having flow passages therethrough substantially in axial alignment with said inlet and outlet passages, said walls being spaced in the axial direction of the flow passages and formed on adjacent faces with raised annular seat surfaces disposed in upwardly diverging planes, a hollow extension in the body at one side of the flow passages and at somewhat greater elevation than said flow passages, a rotatable spindle mounted in said body extension, a gate actuating arm fixed to said spindle, a gate mounted at the free end of said arm for movement in an arcuate path and including a pair of leaves arranged one on each side of the actuating arm and a universal joint connecting the leaves and extending through the actuating arm; said gate leaves having raised annular seat surfaces formed on their outer faces and adapted for wedging co-operation with the body seats and marginal portions completely encircling the gate seat surfaces and set back from the planes of the gate seat surfaces; and ribs in the body curved in conformity with the path of gate movement and adapted to engage the outer surfaces of the gate at diametrically opposite points, thereby to restrain the relative movement of the gate leaves when out of contact with the body seat surfaces and to hold the seat surfaces of the gate leaves out of contact with other parts of the inner surface of the body, except when the valve is fully closed.

6. A quick acting gate valve comprising a body portion having axially aligned inlet and outlet passages; a pair of transverse walls within the gate body having flow passages therethrough substantially in axial alignment with said inlet and outlet passages, said walls being spaced in the axial direction of the flow passages and formed on adjacent surfaces with raised annular seat surfaces disposed in upwardly diverging planes; a hollow extension in the body at one side of the flow passages and at somewhat greater elevation than said flow passages; a rotatable spindle mounted in said body extension; a gate actuating arm fixed to said spindle; a gate mounted at the free end of said arm for movement in an arcuate path and including a pair of leaves arranged one on each side of the actuating arm and a universal joint connecting the leaves and extending through the actuating arm, said gate leaves having raised annular seat surfaces formed on their outer faces and adapted for wedging co-operation with the body seats; and ribs in the body converging upwardly from their lower ends and curved in conformity with the path of gate movement and adapted to engage the outer surfaces of the gate at diametrically opposite points from the commencement of and throughout opening movement of the gate, thereby to restrain the relative movement of the gate leaves when out of contact with the body seat surfaces and to hold the seat surfaces of the gate leaves out of contact with the inner surface of the body, except when the valve is fully closed, the said gate leaves having marginal portions disposed radially outward from the seat surfaces of the leaves and in different planes therefrom and adapted to engage said guide ribs to the exclusion of the gate seat surfaces.

7. A quick acting gate valve comprising a body portion having axially aligned inlet and outlet passages; a pair of transverse walls within the gate body having flow passages therethrough in axial alignment with said inlet and outlet passages, said walls being spaced in the axial direction of the flow passages and formed on adjacent surfaces with raised annular seat surfaces disposed in upwardly diverging planes; a hollow extension in the body at one side of the flow passages and at somewhat greater elevation than said flow passages; a rotatable spindle mounted in said body extension; a gate actuating arm fixed to said spindle; a gate mounted at the free end of said arm for movement in an arcuate path and including a pair of leaves arranged one on each side of the actuating arm and a universal joint connecting the leaves and extending through the actuating arm, said gate leaves having annular seat surfaces formed on their outer faces and adapted for wedging co-operation with the body seats; and ribs in the body on opposite sides of the axis of said inlet and outlet passages curved in conformity with the path of gate movement and adapted to engage the outer surfaces of the gate at diametrically opposite points, thereby to restrain the relative movement of the gate leaves when out of contact with the body seat surfaces and to hold the seat surfaces of the gate leaves out of contact with the inner surface of the body, except when the valve is fully closed, the said ribs on each side of the axis of said inlet and outlet passages converging upwardly from their lower ends at least part way to their upper ends thereby to clamp the gate leaves together as the valve opens and hold the seat surfaces thereof out of contact with the interior of the body and to restrain the gate leaves against divergence greater than the divergence of the body seats, the convergence of the ribs being in such relation to the divergence of the body seats that the gate leaves are moved out of and held out of contact with the body seat surfaces at the commencement of gate opening movement.

8. A quick acting gate valve comprising a body portion having axially aligned inlet and outlet passages; a pair of transverse walls within the gate body having flow passages therethrough in axial alignment with said inlet and outlet passages, said walls being spaced in the axial direction of the flow passages and formed on adjacent surfaces with raised annular seat surfaces disposed in upwardly diverging planes; a hollow extension in the body at one side of the flow passages and at somewhat greater elevation than said flow passages; a rotatable spindle mounted in said body extension; a gate actuating arm fixed to said spindle; a gate mounted at the free end of said arm and including a pair of leaves arranged one on each side of the actuating arm and a universal joint connecting the leaves and extending through the actuating arm, said gate leaves having raised annular seat surfaces formed on their outer faces and adapted for wedging co-operation with the body seats and having marginal portions disposed radially outward of the gate seat surfaces and out of the planes of the gate seat surfaces; and ribs in the body on opposite sides of the axis of said inlet and outlet passages curved in conformity with the path of gate movement and adapted to engage the said marginal portions of the gate at diametrically opposite points, thereby to restrain the relative movement of the gate leaves when out of contact with the body seat surfaces and to hold the seat surfaces of the gate leaves out of contact with the inner surface of the body, except when the valve is fully closed, the said ribs on each side of the axis of said inlet and outlet passages converging upwardly from their lower ends at least part way to their upper ends thereby to clamp the gate leaves together as the valve opens and hold the seat surfaces thereof out of contact with the interior of the body and to restrain the gate leaves against divergence greater than the divergence of the body seats, the convergence of the ribs being in such relation to the divergence of the body seats that the gate leaves are moved out of and held out of contact with the body seat surfaces at the commencement of gate opening movement, the ribs on one side of the axis of the inlet and outlet passages having greater convergence than the ribs on the other side of the said axis.

JAMES H. WEBB.

REFERENCES CITED

The following references are of record in the file of this patent:

UNITED STATES PATENTS

| Number | Name | Date |
|---|---|---|
| 301,823 | Lunkenheimer | July 8, 1884 |
| 341,424 | Lunkenheimer | May 4, 1886 |
| 711,262 | Riegler | Oct. 14, 1902 |
| 838,509 | O'Brien | Dec. 11, 1906 |
| 1,436,438 | Cryer | Nov. 21, 1922 |
| 2,096,420 | Barr | Oct. 19, 1937 |
| 2,253,881 | Anderson | Aug. 26, 1941 |
| 2,293,017 | Gleeson | Aug. 11, 1942 |

FOREIGN PATENTS

| Number | Country | Date |
|---|---|---|
| 397,313 | Canada | June 17, 1941 |